United States Patent
Van den Bergh

(10) Patent No.: US 9,745,912 B2
(45) Date of Patent: Aug. 29, 2017

(54) METHOD FOR AVOIDING PRE-IGNITIONS DURING THE OPERATION OF AN INTERNAL COMBUSTION ENGINE

(71) Applicant: Dr. Ing. h.c. F. Porsche Aktiengesellschaft, Stuttgart (DE)

(72) Inventor: Ruben Emiel Van den Bergh, Illingen-Schuetzingen (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 9 days.

(21) Appl. No.: 14/810,521

(22) Filed: Jul. 28, 2015

(65) Prior Publication Data

US 2016/0053703 A1    Feb. 25, 2016

(30) Foreign Application Priority Data

Aug. 20, 2014  (DE) .................. 10 2014 111 889

(51) Int. Cl.
| | |
|---|---|
| *F02D 41/14* | (2006.01) |
| *F02D 35/02* | (2006.01) |
| *F02D 41/00* | (2006.01) |
| *F02D 41/22* | (2006.01) |

(52) U.S. Cl.
CPC ....... *F02D 41/1498* (2013.01); *F02D 35/023* (2013.01); *F02D 35/027* (2013.01); *F02D 41/0002* (2013.01); *F02D 41/22* (2013.01); *F02D 2041/001* (2013.01); *Y02T 10/42* (2013.01)

(58) Field of Classification Search
CPC .. F02D 41/1498; F02D 35/027; G01M 15/11; G01M 15/12
See application file for complete search history.

(56) References Cited

U.S. PATENT DOCUMENTS

| | | | |
|---|---|---|---|
| 2002/0029105 A1 | 3/2002 | Sauler et al. | |
| 2009/0217906 A1* | 9/2009 | Nishimoto | ............ F02D 13/023 123/348 |
| 2010/0242930 A1* | 9/2010 | Shinohara | ........... F02D 13/0265 123/568.14 |

(Continued)

FOREIGN PATENT DOCUMENTS

| | | |
|---|---|---|
| DE | 10043498 A1 | 3/2002 |
| DE | 102009008248 A1 | 8/2010 |

(Continued)

*Primary Examiner* — Hung Q Nguyen
*Assistant Examiner* — Xiao Mo
(74) *Attorney, Agent, or Firm* — Leydig, Voit & Mayer, Ltd.

(57) ABSTRACT

A method for avoiding pre-ignitions during the operation of an internal combustion engine includes measuring a noise level of a combustion process using an acceleration sensor. An amplitude an amplitude of the measured noise level is measured to detect pre-ignitions. If, in the analysis, the measured noise level of a combustion cycle exceeds a limiting value n times, a safety operating mode of the internal combustion engine for reducing an effecting compression in the combustion chamber is activated. The safety operating mode is maintained if exceeding of the amplitude limiting value is also detected in subsequent combustion cycles of the internal combustion engine.

11 Claims, 2 Drawing Sheets

(56) References Cited

U.S. PATENT DOCUMENTS

| | | | |
|---|---|---|---|
| 2011/0239986 A1* | 10/2011 | Shishime | F02D 13/0238 123/406.29 |
| 2013/0151116 A1* | 6/2013 | Kusumoto | F02D 45/00 701/102 |
| 2013/0238223 A1 | 9/2013 | Fischer et al. | |

FOREIGN PATENT DOCUMENTS

| | | |
|---|---|---|
| DE | 102012203487 A1 | 9/2013 |
| EP | 1715179 A2 | 10/2006 |

\* cited by examiner

METHOD FOR AVOIDING PRE-IGNITIONS DURING THE OPERATION OF AN INTERNAL COMBUSTION ENGINE

CROSS REFERENCE TO RELATED APPLICATIONS

Priority is claimed to German Patent Application No. DE 10 2014 111 889.8, filed on Aug. 20, 2014, the entire disclosure of which is hereby incorporated by reference herein.

FIELD

The present invention relates to a method for avoiding pre-ignitions during the operation of an internal combustion engine in accordance with the preamble of the main claim.

BACKGROUND

It is known that "pre-ignitions" in internal combustion engines lead to high combustion pressures, which generally cause severe knock and, as a result, engine damage.

The practice of measuring and monitoring knock intensity during combustion by means of an acceleration sensor is known from the prior art, e.g. DE 100 43 498 A1. When increased knock in the internal combustion engine is detected, measures which reduce engine knock are automatically initiated for a brief period by the engine control system.

The disadvantage with this procedure is that the tendency of the internal combustion engine for pre-ignitions is counteracted by suitable measures only after knocking of the internal combustion engine has already occurred.

SUMMARY

In an embodiment, the present invention provides a method for avoiding pre-ignitions during the operation of an internal combustion engine. The method includes measuring a noise level of a combustion process using an acceleration sensor. An amplitude an amplitude of the measured noise level is measured to detect pre-ignitions. If, in the analysis, the measured noise level of a combustion cycle exceeds a limiting value n times, a safety operating mode of the internal combustion engine for reducing an effecting compression in the combustion chamber is activated. The safety operating mode is maintained if exceeding of the amplitude limiting value is also detected in subsequent combustion cycles of the internal combustion engine.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
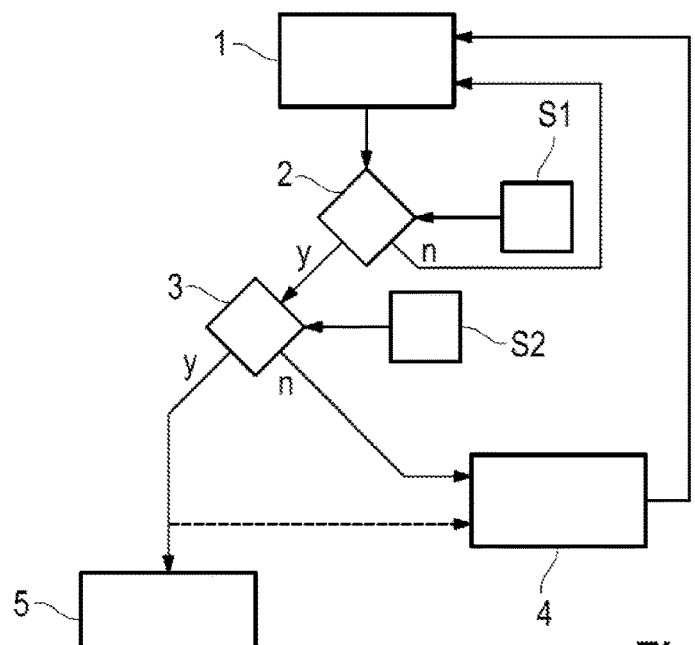
FIG. 1 shows a schematic view a method in accordance with an embodiment of the present invention.

An aspect of the present invention is to provide a method for avoiding pre-ignitions on a sustained basis in which the re-occurrence of pre-ignitions and hence of knock is not necessary on every occasion to initiate countermeasures against pre-ignitions.

In an embodiment, the present invention provides a method for avoiding pre-ignitions during the operation of an internal combustion engine, wherein a noise level of the combustion process is measured by means of an acceleration sensor and wherein, to detect pre-ignitions, the amplitude of the measured noise level is analyzed, and wherein furthermore a safety operating mode of the internal combustion engine for reducing the effective compression in the combustion chamber of the internal combustion engine is activated on a sustained basis if, in the analysis of the measured noise level, an amplitude limiting value is exceeded n times by the measured noise level.

A method according to embodiments of the invention has the advantage over the prior art that, when pre-ignitions are detected, sustained measures to avoid pre-ignitions are initiated. In subsequent combustion cycles, the occurrence of pre-ignitions is thus suppressed, even if no more pre-ignitions occur or can be detected. The activation of the safety operating mode for sustained avoidance of pre-ignitions is preferably possible in parallel with measures for reducing engine knock which can be initiated for a brief period. It is conceivable for the customary short-term measures for avoiding knock to be initiated in the case of low amplitudes of the noise level and for the safety operating mode to be activated only when the measured noise level exceeds a higher amplitude limiting value or the higher amplitude limiting value is exceeded at least n times (where n>1). As a sustained response to the occurrence of pre-ignitions, the effective compression in the combustion chamber is reduced. That is to say, the final combustion pressures and the final combustion temperature are lowered while, at the same time, the maximum engine torque is largely retained. By lowering the final combustion pressures and the final combustion temperature, pre-ignitions can be effectively avoided, even when using fuels of relatively low quality.

According to an embodiment of the present invention, it is envisaged that the safety operating mode remains activated even if no exceeding of the amplitude limiting value is detected in subsequent combustion cycles of the internal combustion engine. Thus, the safety operating mode remains activated even during subsequent combustion cycles, preferably even if the engine has been switched off in the meantime, thus ensuring that the occurrence of pre-ignitions is avoided on a sustained basis. In this way, the mechanical stress on the internal combustion engine can advantageously be reduced and engine running time can be increased.

According to an embodiment of the present invention, it is envisaged that the inlet timing of an inlet valve of the internal combustion engine is modified in order to reduce the effective compression in the safety operating mode. In particular, the inlet valve is modified in such a way in the safety operating mode that the closing point of the inlet valve is retarded. By retarding the inlet timings of the inlet valves, it is possible to lower the effective compression of the engine without having to modify the geometrical compression by means of modified engine components. Reducing the effective compression leads to avoidance of pre-ignitions.

According to an embodiment of the present invention, it is envisaged that the exhaust timing of an exhaust valve of the internal combustion engine is furthermore modified in the safety operating mode. In particular, the exhaust timing is modified in such a way in the safety operating mode that the closing point of the exhaust valve is retarded. Maximum retardation of the exhaust timings of the exhaust valve ensures an increase in the overlap of the valve timings, i.e. the inlet and exhaust valves are opened simultaneously, as a result of which an increased scavenging rate is achieved in the combustion chamber of the internal combustion engine, in particular is maintained despite the retardation of the inlet timings.

According to an embodiment of the present invention, it is envisaged that enrichment of the combustion mixture is brought about on a sustained basis in the safety operating mode. The chemical state of the combustion mixture in the combustion chamber can advantageously be influenced in a positive way by sustained enrichment of the mixture, and hence the pre-ignition sensitivity can be greatly reduced.

According to an embodiment of the present invention, it is envisaged that pressure limitation in the intake pipe is performed in the safety operating mode. Limitation of the final compression pressure is preferably achieved by limiting the intake pipe pressure, thereby suppressing the occurrence of pre-ignitions.

According to an embodiment of the present invention, it is envisaged that the injection characteristic, in particular as regards single and multiple injection, is modified in such a way in the safety operating mode that the risk of pre-ignitions is lowered.

According to an embodiment of the present invention, it is envisaged that the safety operating mode is activated on a sustained basis if n is between 1 and 20, preferably between 1 and 10 and particularly preferably between 1 and 5 in a single combustion cycle. The sustained reduction of the effective compression is thus initiated only when severe knock occurs multiple times during combustion. The threshold is preferably freely adjustable.

According to an embodiment of the present invention, it is envisaged that the safety operating mode is deactivated again after the expiry of a predetermined mileage and/or running time of the vehicle. The sustained reduction in the effective compression is automatically deactivated again after the expiry of the predetermined mileage and/or running time. If multiple pre-ignitions then occur again, the safety operating mode is automatically reactivated.

FIG. 1 shows a schematic view of the method according to the invention for avoiding pre-ignitions during the operation of an internal combustion engine. Here, the noise level 10 of an internal combustion engine is first of all measured and analyzed in the context of a first method step 1. During this process, the noise level 10 is determined by means of at least one signal sensor arranged on the internal combustion engine.

In a second method step 2, the system checks whether the amplitude 11 of the measured noise level 10 exceeds a first amplitude limiting value S1. If the first amplitude limiting value S1 is not exceeded, the noise level 10 continues to be monitored.

If exceeding of the first amplitude limiting value S1 is detected, the system checks in a third method step 3 whether the measured noise level 10 also exceeds a second amplitude limiting value S2.

If the second amplitude limiting value S2 is not exceeded, short-term one-time measures 4 are initiated in order to suppress knocking in the internal combustion engine. For example, the benefit of the scavenging effect is discarded in order to increase enrichment briefly. Once this brief one-time measure 4 has been carried out, the internal combustion engine returns to its "normal" operating state and the noise level 10 continues to be monitored.

If the second amplitude limiting value S2 is exceeded one or more times, a safety operating mode 5 is activated on a sustained basis. In contrast to the short-term one-time measures 4, measures against pre-ignitions which protect the internal combustion engine permanently from pre-ignitions and thus also apply during future combustion cycles which themselves do not have any pre-ignitions are initiated in the safety operating mode 5 activated on a sustained basis. It is conceivable that the safety operating mode 5 also remains activated if the internal combustion engine is switched off in the meantime. The safety operating mode 5 switches off automatically after a predetermined mileage or running time of the internal combustion engine. If the second amplitude limiting value S2 is then exceeded again, the safety operating mode 5 switches on again automatically in accordance with method steps 1 to 3 described above.

The pre-ignition frequency is primarily affected by the combustion pressure, the final combustion temperature, the local chemical states of the fuel mixture and the available time. In the safety operating mode 5, a sustained reduction in the effective compression in the combustion chamber of the internal combustion engine is brought about, thereby lowering the combustion pressure and the combustion temperature, even when the internal combustion engine is being operated with fuel of low quality. The pre-ignition frequency is thus considerably reduced.

The effective compression is reduced in the safety operating mode 5 by retarding the inlet timings of the inlet valves of the internal combustion engine to a maximum retardation. A lower scavenging rate thereby caused is compensated by likewise retarding the exhaust timings of the exhaust valves of the internal combustion engine to a maximum retardation, thereby making it possible to maintain a large overlap between the valve timings of the inlet and exhaust valves. In addition, a pressure limitation in the intake pipe to a maximum final compression pressure is set in the safety operating mode 5. It is conceivable that enrichment of the combustion mixture and a modified injection strategy as regards single or multiple injection will furthermore be brought about on a sustained basis in order further to reduce the pre-ignition frequency.

In general, the situation is that short-term one-time measures 4 are initiated when the first amplitude limiting value S1 is exceeded, while the safety operating mode 5 is additionally activated when the second amplitude limiting value S2 is exceeded.

Figure 2:
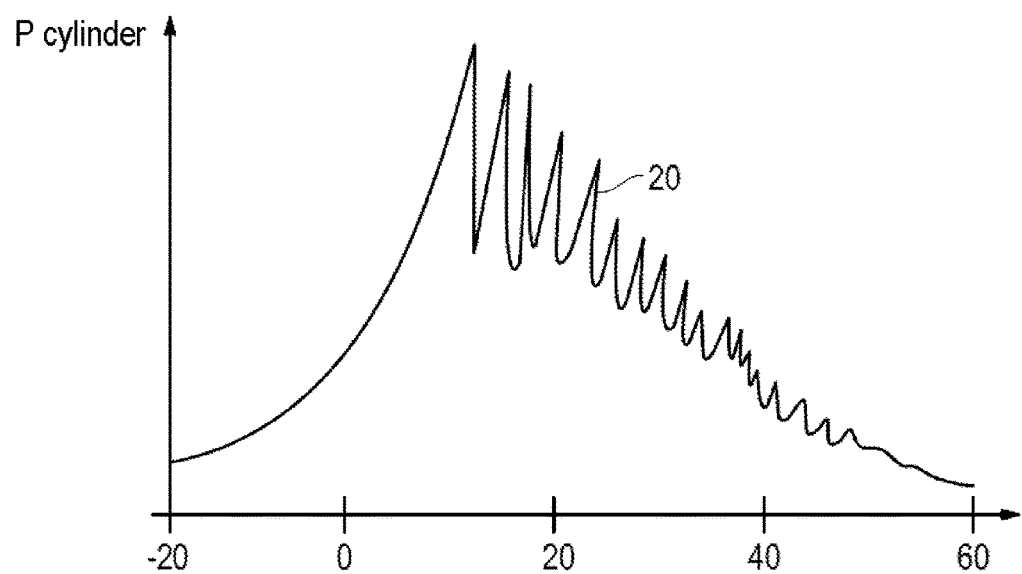
FIG. 2 shows the signal characteristic of the pressure in a cylinder during a combustion.

The variation 20 in the pressure in the cylinder as a function of the crank angle is shown in FIG. 2. It is clearly apparent that the pressure increases continuously as the piston moves in the direction of top dead center (0) and that irregular combustions, "pre-ignitions", propagate at the point of very high compression.

Figure 3:
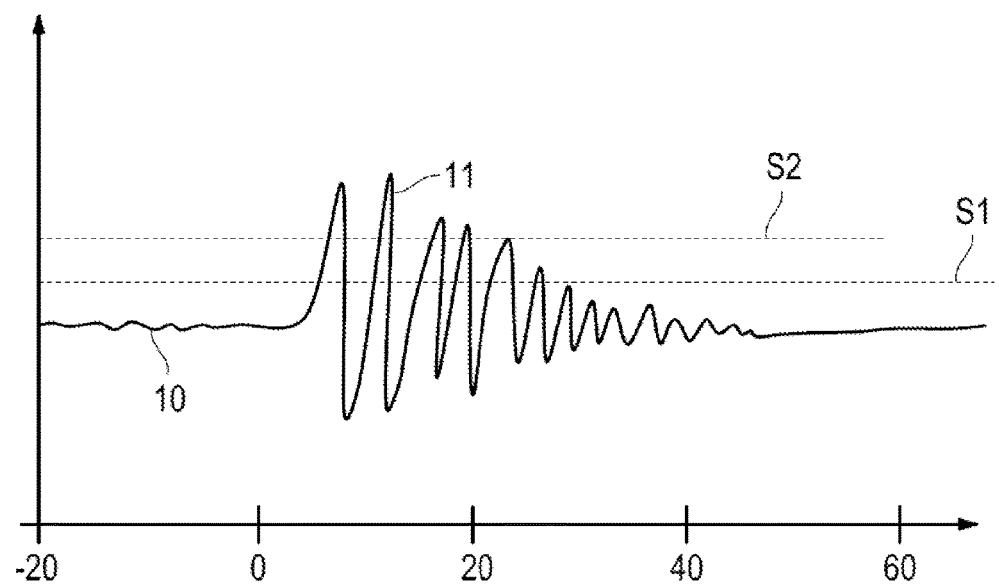
FIG. 3 shows the detected noise level against the crankshaft angle during the combustion.

In FIG. 3, the detected noise level 10 is likewise shown against the crankshaft angle. Both the first amplitude limiting value S1 and the second amplitude limiting value S2 are plotted in the diagram. It can be seen that the maximum amplitudes 11 of the noise level 10 during knocking of the internal combustion engine exceed the first amplitude limiting value S1 and the second amplitude limiting value S2.

The second amplitude limiting value S2 is twice the value of the first amplitude limiting value S1, for example.

It should be noted that the knock intensity affects the respective knock threshold since the current noise level is always included in the calculations in knock detection. This knock threshold determines the factor for selection and definition of the amplitude limiting values which determine the decision as to whether short-term or long-term measures are to be taken.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for avoiding pre-ignitions during the operation of an internal combustion engine, the method comprising:
    measuring a noise level of a combustion process using an acceleration sensor;
    analyzing an amplitude of the measured noise level to detect pre-ignitions;
    activating a safety operating mode of the internal combustion engine for reducing an effective compression in a combustion chamber of the internal combustion engine on a sustained basis if, in the analysis, the measured noise level exceeds an amplitude limiting value n times during a combustion cycle; and
    maintaining the safety operating mode until at least one of expiry of a predetermined mileage or expiry of a predetermined running time of the vehicle automatically triggers deactivation of the safety operating mode.

2. The method as claimed in claim 1, further comprising modifying an inlet timing of an inlet valve of the internal combustion engine in order to reduce the effective compression in the safety operating mode.

3. The method as claimed in claim 1, wherein, in the safety operating mode, the inlet timing is modified in such a way that a closing point of the inlet valve is retarded.

4. The method as claimed in claim 1, wherein an exhaust timing of an exhaust valve of the internal combustion engine is furthermore modified in the safety operating mode.

5. The method as claimed in claim 1, wherein, the safety operating mode, the exhaust timing is modified in such a way that a closing point of the exhaust valve is retarded.

6. The method as claimed in claim 1, wherein, in the safety operating mode, enrichment of the combustion mixture is brought about on a sustained basis.

7. The method as claimed in claim 1, further comprising performing pressure limitation in the intake pipe in the safety operating mode.

8. The method as claimed in claim 1, wherein an injection characteristic is modified in the safety operating mode.

9. The method as claimed in claim 1, wherein the safety operating mode is activated on a sustained basis if there is a plurality of combustion cycles with a high noise level.

10. The method as claimed in claim 1, wherein n>1.

11. The method as claimed in claim 1, wherein the maintaining the safety operating mode until at least one of expiry of a predetermined mileage or expiry of a predetermined running time of the vehicle includes maintaining the safety operating mode during subsequent combustion cycles in which no exceeding of the amplitude limiting value is detected.

* * * * *